(12) United States Patent
Toraille et al.

(10) Patent No.: US 12,505,790 B2
(45) Date of Patent: Dec. 23, 2025

(54) ELECTRONIC DISPLAY DEVICE WITH ANTI-ALIASING

(71) Applicant: THALES, Meudon (FR)

(72) Inventors: Vincent Toraille, Merignac (FR); Franck Jeulin, Merignac (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 18/922,270

(22) Filed: Oct. 21, 2024

(65) Prior Publication Data

US 2025/0148966 A1   May 8, 2025

(51) Int. Cl.
*G09G 3/32*   (2016.01)

(52) U.S. Cl.
CPC ....... *G09G 3/32* (2013.01); *G09G 2320/0626* (2013.01); *G09G 2320/0666* (2013.01); *G09G 2340/14* (2013.01)

(58) Field of Classification Search
CPC ....................................................... G09G 3/32
See application file for complete search history.

(56) References Cited

U.S. PATENT DOCUMENTS

| | | | |
|---|---|---|---|
| 2019/0278134 A1* | 9/2019 | Okamoto | G02B 6/0011 |
| 2021/0142716 A1 | 5/2021 | Robin et al. | |
| 2022/0077121 A1 | 3/2022 | Bae et al. | |
| 2022/0197052 A1* | 6/2022 | Makinen | G02B 3/0037 |
| 2022/0352131 A1 | 11/2022 | Choi et al. | |
| 2023/0132981 A1 | 5/2023 | Bower et al. | |

* cited by examiner

*Primary Examiner* — Gustavo Polo

(74) *Attorney, Agent, or Firm* — BakerHostetler

(57) ABSTRACT

A method is provided of display of a dot-matrix digital image including controlling groups of three coloured elements, each element being of a different colour, each group forming one elementary element of a colour image, and carrying out anti-aliasing processing of the display. Each coloured element is a plano-convex assembly of a plurality of light-emitting diodes, each of the elements in a group being covered by a plate that is common to the diodes of the element and that scatters coloured light associated with the element, the anti-aliasing processing being carried out by applying commands for various light intensities to the light-emitting diodes inside a given element.

8 Claims, 3 Drawing Sheets

ELECTRONIC DISPLAY DEVICE WITH ANTI-ALIASING

CROSS-REFERENCE TO RELATED APPLICATION

This application claims priority to foreign French patent application No. FR 2311484, filed on Oct. 23, 2023, the disclosure of which is incorporated by reference in its entirety.

FIELD OF THE INVENTION

The invention relates to the field of display screens, in particular for aeronautical applications, but also for other applications.

BACKGROUND

In the aeronautical field, display screens may be placed in the cockpit of a civil or military aircraft (aeroplane or helicopter). These screens may in particular serve for navigation, map display, viewing an artificial horizon, or taxiing, but other applications exist and are envisageable. Outside of the aeronautical field, these screens may be used in mobile telephones, tablets, computers, televisions, or even display screens in public places.

These screens are often designed in LCD technology (LCD standing for Liquid-Crystal Display). In such screens, backlighting, which in recent screens has been provided by white light-emitting diodes (LEDs), is constantly kept on and depending on the orientation of the liquid crystals light is transmitted or not transmitted locally. It is therefore liquid crystals that define the pixels. In order to obtain colouration, three liquid-crystal cells per pixel are used and each is equipped, parallel to the liquid crystal, with a red, green or blue colour filter, this making it possible, by turning on one or more of them, to obtain the desired colour. The backlighting LEDs, which may be 2 to 3 mm in width, are commonly placed on an edge (in a so-called edge-lit configuration) with a planar waveguide, for example one made of polymethyl methacrylate (PMMA, acrylic or Plexiglas) filled in its bulk so as to scatter in the plane. The backlighting LEDs are constantly turned on.

LCD screen technologies, based on transmission and occultation of light constantly present in the background, face competition from technologies in which coloured light is emitted by LEDs that are turned on and off to produce the image-reference is then made to self-lit pixels. Thus, for example, OLED screens, without liquid crystals and without constant backlighting, have encountered success in the consumer sector, for example in smartphones—the pixels may be 150 µm for example. OLEDs or organic LEDs the size of which is of the order of magnitude of that of the pixel are formed by superposing a plurality of organic semiconductor layers. Micro-LEDs are for their part a little smaller (as little as 50 µm in width, or even less) and are constructed using an inorganic material, primarily gallium nitride. Three OLEDs, or three micro-LEDs, one of each base colour—red (about 630 nm), green (about 570 nm) and blue (about 450 nm)—are often used to form one pixel.

The OLEDs or micro-LEDs are controlled by CMOS circuits on silicon or by thin-film transistors (TFTs). Via these control circuits, a command current is transmitted thereto.

Micro-LEDs have been envisaged that are natively of various colours, these various colours being achieved by adjusting the nature and/or thickness of the inorganic semiconductor layers of the stack. Micro-LEDs and OLEDs are also known that are natively blue, energy-efficient and that, to modify colour, use a colour filter placed above the diode, this colour filter possibly being based on quantum dots, or a phosphor, and generating, from the blue, either green or red depending on the size of the quantum dot, in both cases with a line width that is also quite small, 20 to 30 nm at half-maximum.

Anti-aliasing is a set of methods that make it possible to avoid noticing the jaggedness of pixels. Pixels that are relatively grey or relatively coloured may be positioned to create transitions that seem smooth to the eye. These pixels, as regards their position, light intensity and colour, may be determined by interpolation or smoothing.

SUMMARY OF THE INVENTION

A new anti-aliasing method aiming to obtain a smooth image by taking advantage of the micro-LED substrates that are now available is provided here. These substrates are obtained by transferring micro-LEDs from a manufacturing medium to a glass substrate dedicated to the screen, and only the micro-LEDs that it is desired to transfer are placed on the substrate of the screen, with the pitch between the micro-LEDs that is desired for the design of the screen.

To improve existing anti-aliasing techniques, a method of display of a dot-matrix digital image is provided, this method comprising, on the one hand, controlling groups of three coloured elements, each element being of a different colour, each group forming one element or elementary pixel of a colour image, and the method comprising, on the other hand, anti-aliasing processing of the display.

This method is particular because each coloured element is a plano-convex assembly of a plurality of light-emitting diodes, each of said elements in a group being covered by a plate that is common to said diodes of said element and that scatters coloured light associated with said element, the anti-aliasing processing being carried out by applying commands for various light intensities to the light-emitting diodes inside a given element.

By virtue of this technique, anti-aliasing is implemented inside the pixels. This is particularly advantageous when displaying video images, recorded with a given resolution, on a screen consisting of micro-LEDs with a finer pitch than the resolution that the recording makes possible to reproduce, thus avoiding consumption of a large amount of computing power, while the anti-aliasing nevertheless makes it possible to obtain a smooth image in which the jaggedness of the pixels cannot be seen. Local dimming is thus achieved inside the pixels and inside the assemblies of a given colour. This is very useful when displaying fine symbols. The fineness of the anti-aliasing is improved, without however increasing resolution and therefore computational cost.

According to optional and advantageous features:
- the various light intensities inside an element form an intensity gradient;
- the plano-convex assembly is a rectangle, and the various light intensities are controlled in terms of gradients on the first side and on the second side of the rectangle;
- the light-emitting diodes are so-called micro-LEDs based on gallium nitride;
- the light-emitting diodes are blue diodes, the common plates being green, red and almost colourless;
- the common plates comprise quantum dots of various sizes to yield various colours;

the coloured elements are elongate and placed parallel to one another in a direction transverse to the direction of elongation.

A device for achieving display of a dot-matrix digital image is also provided, this device comprising means for controlling groups of three coloured elements of the device, each element being of a different colour, each group forming one elementary element of a colour image, and a means for carrying out anti-aliasing processing of the display.

This display device is particular because each coloured element is a plano-convex assembly of a plurality of light-emitting diodes, each of said elements in a group being covered by a plate that is common to said diodes of said element and that scatters coloured light associated with said element, the means for carrying out anti-aliasing processing applying commands for various light intensities to the light-emitting diodes inside a given element.

BRIEF DESCRIPTION OF THE DRAWINGS

The invention will be better understood and other advantages will become apparent on reading the following non-limiting description with reference to the appended figures, in which.

DETAILED DESCRIPTION

Figure 1:
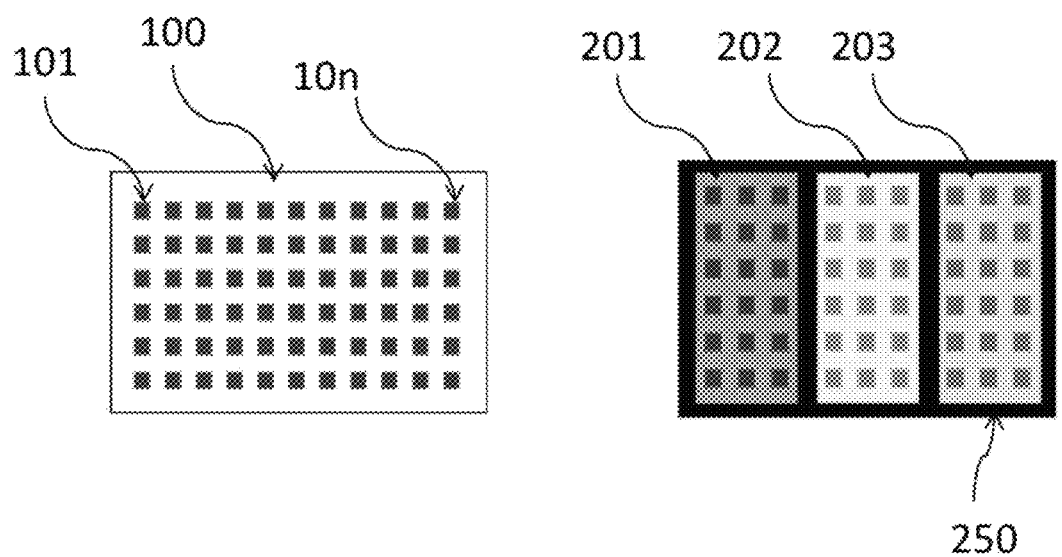
FIG. 1 is a view of an initial arrangement of micro-LEDs according to one embodiment of the invention.

FIG. 1 shows a carrier 100, which is a planar, rigid or semi-rigid object with two sides, of constant thickness, bearing micro-LEDs 101, . . . 10n arranged in an array of rectangular unit cell, or in a chequerboard pattern, on one of its sides. The micro-LEDs 101, . . . 10n are of square geometry, seen from above. They are separated from one another by a distance that is of the same order of magnitude as their size. In the figure, the micro-LEDs 101, . . . 10n are 11 by 6 in number, i.e. there are 66 micro-LEDs. They are blue micro-LEDs, which are known for their good energy efficiency.

FIG. 1 proposes two ways of using the carrier 100, by depositing, on the face bearing the micro-LEDs, plates that let light pass.

In a first embodiment, shown in the top right-hand part of the figure, rectangular plates 201, 202 and 203 have been chosen to cover 3×6 micro-LEDs and they are placed on the carrier 100, beside one another, separated by a deposit of material of high optical density (so-called black matrix). Two rows of 6 micro-LEDs are covered, incidentally, by the black matrix.

The plate 201 is a red colour filter based on quantum dots (even though less sophisticated solutions are possible), the plate 202 is a green colour filter also based on quantum dots and the plate 203 is a passive scattering material that is chosen so that the angular scattering of the three plates 201, 202 and 203 is the same. It therefore delivers blue light, just like the underlying micro-LEDs.

The assembly made up of the three plates 201-203 and of the micro-LEDs that they cover forms one pixel, the three colours formed making it possible by combination to obtain all the colours in the visible, and the 66 micro-LEDs are therefore controlled so as to deliver the desired colour and brightness for a pixel of this size, which corresponds to a sub-optimal resolution given the small size of the micro-LEDs, but which may be quite similar to the resolution obtained with older technologies, such as backlit LCD screens.

Figure 2:
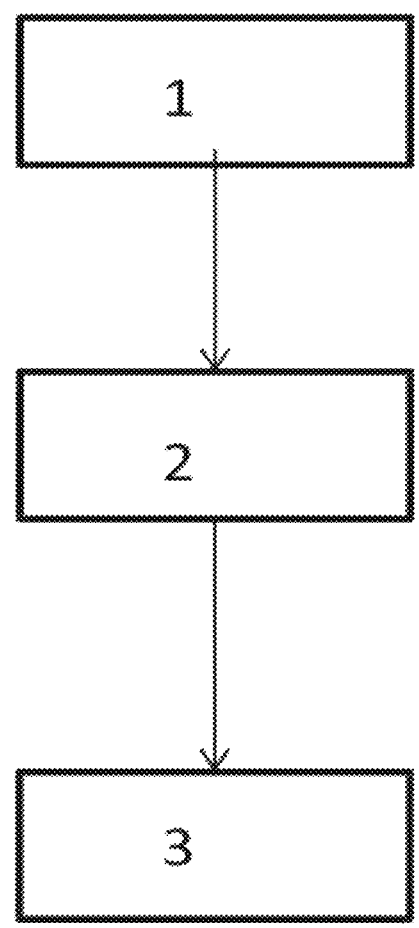
FIG. 2 is a flowchart showing a method according to the invention.

FIG. 2 shows the method according to the invention. In a step 1, the total brightness and the colour of a pixel are established, then in a step 2, the brightness of each micro-LED of the pixel is adjusted, taking into account the colour associated with the pixel, to obtain a whole pixel that is of the right colour and brightness, but that in addition guarantees the smoothness of the image, despite its pixelation.

In step 3, the customized display is generated on the screen comprising emissive pixels shown in FIG. 1.

Figure 3:
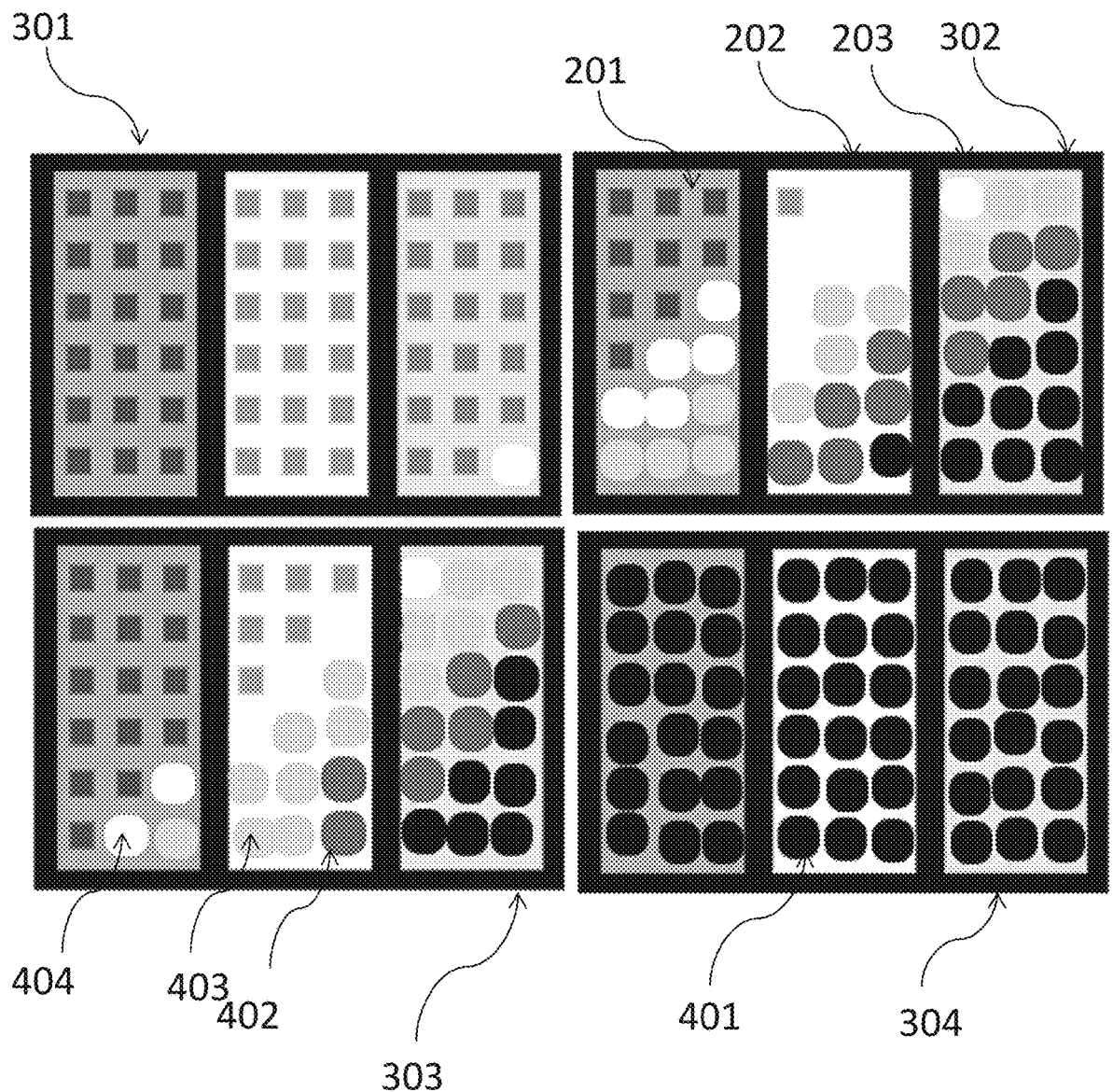
FIG. 3 is a view of a display according to the invention.

FIG. 3 shows a display on the screen of FIG. 1, according to the method of FIG. 2. Four pixels have been shown, namely pixels 301 and 302 in a first row and pixels 303 and 304 in a second row. Pixels 301 and 303 are in a first column and pixels 302 and 304 are in a second column. They are contiguous with one another. Here, a symbol is being displayed on pixel 304, which is lit in its entirety, with all the micro-LEDs in its area emitting a high brightness, in its three colour elements defined by the coloured plates (referenced 202, 202 and 203 for pixel 302, each pixel being identical in this regard).

The micro-LEDs 401 are lit with a high brightness, the micro-LEDs 402 are lit with a medium brightness called high-medium brightness, the micro-LEDs 403 are lit with a medium brightness called low-medium brightness, and the micro-LEDs 404 are lit with a low brightness. The other micro-LEDs are not lit. Therefore all the micro-LEDs of pixel 304 are lit with a high brightness, and one gradient is computed and implemented in the direction of the columns and another gradient computed and implemented in the direction of the rows so that only a few diodes of the pixels 303 and 302, in proximity to their respective borders with pixel 304, are lit with a high brightness, then, with distance from pixel 304, a high-medium brightness, a low-medium brightness, then lastly a low brightness.

Fine anti-aliasing is thus applied, since it is based on attenuation within the pixels, or even within the dots of base colour. The cost in terms of computational load is particularly improved with respect to techniques that would involve a higher resolution being managed to define the resolution at the level of the individual micro-LEDs, and not of the pixels 301-304.

The invention claimed is:

1. A method of display of a dot-matrix digital image comprising controlling groups of three coloured elements, each coloured element being of a different colour, each group forming one elementary pixel of a colour image, the method in addition comprising anti-aliasing processing of the display, wherein each coloured element is a plano-convex assembly of a plurality of light-emitting diodes, each of said elements in a group being covered by a plate that is common to said diodes of said element and that scatters coloured light associated with said element, the anti-aliasing processing being carried out by applying commands for various light intensities to the light-emitting diodes inside a given element,
    wherein the plano-convex assembly is a rectangle, and in that the various light intensities are controlled in terms of gradients on a first side and on a second side of the rectangle.

2. The method of display of a dot-matrix digital image according to claim 1, wherein the various light intensities inside an element form an intensity gradient.

3. The method of display of a dot-matrix digital image according to claim 1, wherein the light-emitting diodes are so-called micro-LEDs based on gallium nitride.

4. The method of display of a dot-matrix digital image according to claim 1, wherein the light-emitting diodes are blue diodes, the common plates being green, red and almost colourless.

5. The method of display of a dot-matrix digital image according to claim 1, wherein the common plates comprise quantum dots of various sizes to yield various colours.

6. A method of display of a dot-matrix digital image comprising controlling groups of three coloured elements, each coloured element being of a different colour, each group forming one elementary pixel of a colour image, the method in addition comprising anti-aliasing processing of the display, wherein each coloured element is a plano-convex assembly of a plurality of light-emitting diodes, each of said elements in a group being covered by a plate that is common to said diodes of said element and that scatters coloured light associated with said element, the anti-aliasing processing being carried out by applying commands for various light intensities to the light-emitting diodes inside a given element,
  wherein the coloured elements are elongate and placed parallel to one another in a direction transverse to the direction of elongation.

7. A device for achieving display of a dot-matrix digital image comprising means for controlling groups of three coloured elements of the device, each element being of a different colour, each group forming one elementary element of a colour image, and a means for carrying out anti-aliasing processing of the display, wherein each coloured element is a plano-convex assembly of a plurality of light-emitting diodes, each of said elements in a group being covered by a plate that is common to said diodes of said element and that scatters coloured light associated with said element, the means for carrying out anti-aliasing processing applying commands for various light intensities to the light-emitting diodes inside a given element,
  wherein the plano-convex assembly is a rectangle, and in that the various light intensities are controlled in terms of gradients on a first side and on a second side of the rectangle.

8. A device for achieving display of a dot-matrix digital image comprising means for controlling groups of three coloured elements of the device, each element being of a different colour, each group forming one elementary element of a colour image, and a means for carrying out anti-aliasing processing of the display, wherein each coloured element is a plano-convex assembly of a plurality of light-emitting diodes, each of said elements in a group being covered by a plate that is common to said diodes of said element and that scatters coloured light associated with said element, the means for carrying out anti-aliasing processing applying commands for various light intensities to the light-emitting diodes inside a given element,
  wherein the coloured elements are elongate and placed parallel to one another in a direction transverse to the direction of elongation.

\* \* \* \* \*